(12) United States Patent
Akatsu et al.

(10) Patent No.: US 6,842,274 B2
(45) Date of Patent: Jan. 11, 2005

(54) LIGHT SCANNER AND IMAGE FORMATION APPARATUS THEREWITH

(75) Inventors: Kazuhiro Akatsu, Ibaraki (JP); Takeshi Mochizuki, Ibaraki (JP)

(73) Assignee: Hitachi Printing Solutions, Ltd., Ebina (JP)

( * ) Notice: Subject to any disclaimer, the term of this patent is extended or adjusted under 35 U.S.C. 154(b) by 0 days.

(21) Appl. No.: 10/288,447

(22) Filed: Nov. 6, 2002

(65) Prior Publication Data

US 2003/0086142 A1 May 8, 2003

(30) Foreign Application Priority Data

Nov. 7, 2001 (JP) ...................................... P2001-342035

(51) Int. Cl.⁷ .............................................. G02B 26/08
(52) U.S. Cl. ...................... 359/204; 359/196; 359/740
(58) Field of Search ................................ 359/204, 212, 359/216–219, 740, 900; 347/233, 241, 243

(56) References Cited

U.S. PATENT DOCUMENTS 5,581,392 A * 12/1996 Hayashi ...................... 359/205
5,610,647 A * 3/1997 Takada ........................ 347/137
6,229,638 B1 * 5/2001 Sakai et al. .................. 359/212

FOREIGN PATENT DOCUMENTS

JP 60-33019 7/1985
JP 62-239119 10/1987

* cited by examiner

*Primary Examiner*—James Phan
(74) *Attorney, Agent, or Firm*—McGinn & Gibb, PLLC

(57) ABSTRACT

A light scanner has a light source 1 of a two-dimensional array consisting of a plurality of light source elements, a coupling lens system 2 for collimating a light flux from the light source 1, a shaping lens system (cylindrical lens 4 and lens 5) for shaping the light flux, light beam deflection means 6 for deflecting and scanning the post-shaped light flux, and a scanning lens system 7 for forming an image of the deflected and scanned light flux on a scanned medium 8. Assuming that the focal length of the coupling lens system 2 is f, a slit 3 for limiting the subscanning direction width as a member for shielding a part of the light flux is placed at a location at a distance of about f from the coupling lens system 2 in an opposite direction to the light source 1.

18 Claims, 4 Drawing Sheets

LIGHT SCANNER AND IMAGE FORMATION APPARATUS THEREWITH

BACKGROUND OF THE INVENTION

1. Field of the Invention

This invention relates to a light scanner and an image formation apparatus such as a laser beam printer using the light scanner and in particular to a light scanner using a light source comprising a two-dimensional array of light source elements and an image formation apparatus.

2. Description of the Related Art

To perform high-speed print or high-dot-density print on a laser beam printer, it is necessary to increase the number of scanning times per unit time. The number of repetitive scanning lines can also be increased to some extent by increasing the number of revolutions of a rotating polygon mirror or increasing the number of mirror surfaces, but there is a limit. Hitherto, it has been well known that a multiple beam scanning technique of scanning a large number of laser beams at a time is effective.

For example, a technique of separating light from a single laser light source element into a plurality of laser beams, modulating each by an output pattern signal, and scanning the laser beams over the scanning surface at the same time through a single rotating polygon mirror and an Fθ lens (JP-A-62-239119), a technique of making an array of a plurality of semiconductor laser elements that can be modulated separately, converting each emitted light into collimated light through a single collimator lens, and scanning a plurality of laser beams over the scanning surface at the same time through a single rotating polygon mirror and an Fθ lens (JP-B-60-33019), and the like are available. However, in the multiple beam scanning lens systems, an optical system comprising a two-dimensional array of elements making up the light source with an increase in the number of beams is not considered.

The size of each of light source elements 9 making up a two-dimensional array is a0 and the spacing between the light source elements 9 is c0, as shown in FIG. 2. To form an image on a scanned medium such as a photoconductor drum through a scanning lens system with main scanning direction magnification Bx and subscanning direction magnification By, the spot diameter of a spot 10 and the spacing between the spots become as shown in FIG. 3. That is, the main scanning direction spot diameter becomes a0·Bx, the subscanning direction spot diameter becomes a0·By, the main scanning direction spacing becomes c0·Bx, and the subscanning direction spacing becomes c0·By. As n light source elements of a two-dimensional array, arranged in the main scanning direction are rotated, the angle at which the subscanning direction spacing between the light source elements becomes equal is found according to expression (1).

$$\tan \theta = 1/n \tag{1}$$

At this time, the array becomes as shown in FIG. 4; when the light source element spacing is c0, the main scanning direction spacing becomes x1, x2 and the subscanning direction spacing becomes y1, y2. At this time, expressions (4) to (7) are satisfied.

$$x1 = c0 \cdot \cos \theta \tag{4}$$

$$y1 = c0 \cdot \sin \theta \tag{5}$$

$$x2 = c0 \cdot \sin \theta \tag{6}$$

$$y2 = c0 \cdot \cos \theta \tag{7}$$

The situation on scanned medium at this time becomes as in FIG. 5; the spot diameter of the spot 10 becomes a0·Bx in the main scanning direction and a0·By in the subscanning direction. The spot spacing is indicated by X1, X2, Y1, Y2. At this time, expressions (8) to (11) are satisfied.

$$X1 = Bx \cdot x1 = Bx \cdot c0 \cdot \cos \theta \tag{8}$$

$$Y1 = By \cdot y1 = By \cdot c0 \cdot \sin \theta \tag{9}$$

$$X2 = Bx \cdot x2 = Bx \cdot c0 \cdot \sin \theta \tag{10}$$

$$Y2 = By \cdot y2 = By \cdot c0 \cdot \cos \theta \tag{11}$$

Here, Y1 indicates scanning lines spacing d on the scanned medium and Y1 may be equal to d. For example, to implement a 600-dpi scanning lens system using a light source of a two-dimensional square array with a0=2.1 μm, c0=90 μm, and n=2, in scanning lens system in related art, the main scanning direction magnification Bx of optical system is set to 20 times and the subscanning direction magnification By is set to 30 times, for example, to set the spot diameter to 42 μm in the main scanning direction corresponding to 600-dpi scanning and 63 μm in the subscanning direction.

At this time, θ becomes equal to 26.57 degrees from expression (1) and the scanning line spacing d becomes 1208 μm from expression (9). In contrast, if the subscanning direction magnification to set d=42.3 μm is found from expression (9), By=1.0508. However, at this time, the subscanning direction spot diameter is 2.2 μm, which is too smaller than the scanning line spacing 42.3 μm.

As described above, if an attempt is made to perform scanning corresponding to 600 dpi with the light source of a two-dimensional square array with a0=2.1 μm, c0=90 μm, and n=2, the scanning line spacing being 42.3 μm and the subscanning direction spot diameter being 42.3 μm or more cannot go hand in hand and thus a problem arises.

SUMMARY OF THE INVENTION

It is therefore an object of the invention to provide a light scanner for enabling scanning line spacing and the spot diameter to be set to predetermined values in a simple structure if a light source of a two-dimensional square array is used, and an image formation apparatus using the light scanner.

To the end, according to a first aspect of the invention, there is provided a light scanner comprising a light source of a two-dimensional array consisting of a plurality of light source elements, a coupling lens system for collimating a light flux from the light source, a shaping lens system for shaping the light flux, light beam deflection means for deflecting and scanning the post-shaped light flux, and a scanning lens system for forming an image of the deflected and scanned light flux on a scanned medium, wherein assuming that the focal length of the coupling lens system is f, between the coupling lens system and the light beam deflection means, a slit for shielding a part of the light flux to limit the light flux width is placed at a location at a distance of about f from the coupling lens system in an opposite direction to the light source.

According to a second aspect of the invention, in the first aspect, n light source elements making up the two-dimensional array are roughly equally spaced from each other in a direction forming angle θ with a main scanning direction and the relation of expression (1) is satisfied.

$$\tan \theta = 1/n \tag{1}$$

According to a third aspect of the invention, in the first aspect, the light source elements making up the two-dimensional array are arranged with spacing of c0 in a direction forming angle θ with a main scanning direction and when the subscanning direction magnification of the scanning lens system is By and the scanning line spacing at the scanning time is d, expression (2) is satisfied.

$$By = d/(c0 \cdot \sin \theta) \qquad (2)$$

According to a fourth aspect of the invention, in the first aspect, when the subscanning direction width of the slit is S1, the size of each light source element is a0, the subscanning direction magnification of the scanning lens system is By, the subscanning direction width of the light flux just before slit is S0, and the scanning line spacing at the scanning time is d, expression (3) is satisfied.

$$S1 \leq a0 \cdot By \cdot S0/d \qquad (3)$$

According to a fifth aspect of the invention, there is provided an image formation apparatus using a light scanner of any of the first aspect to the fourth aspect.

DETAILED DESCRIPTION OF THE PREFERRED EMBODIMENTS

Figure 1:
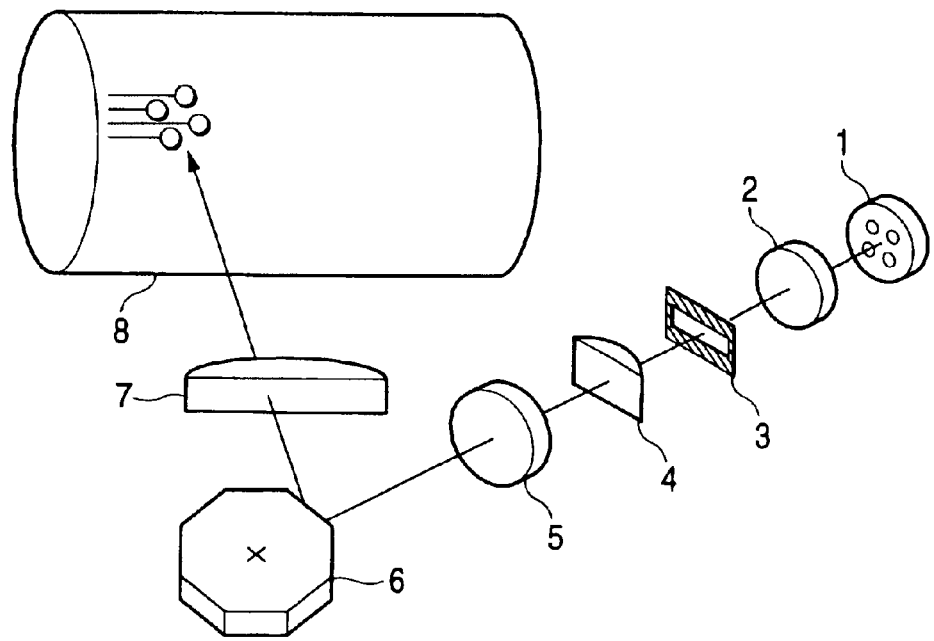
FIG. 1 is a whole perspective view of a light scanner according to a first embodiment of the invention.
Figure 2:
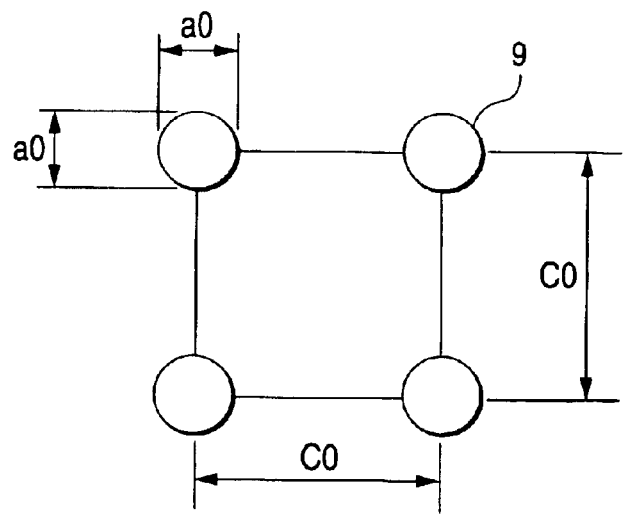
FIG. 2 is a drawing to show a light source of a two-dimensional square array.
Figure 3:
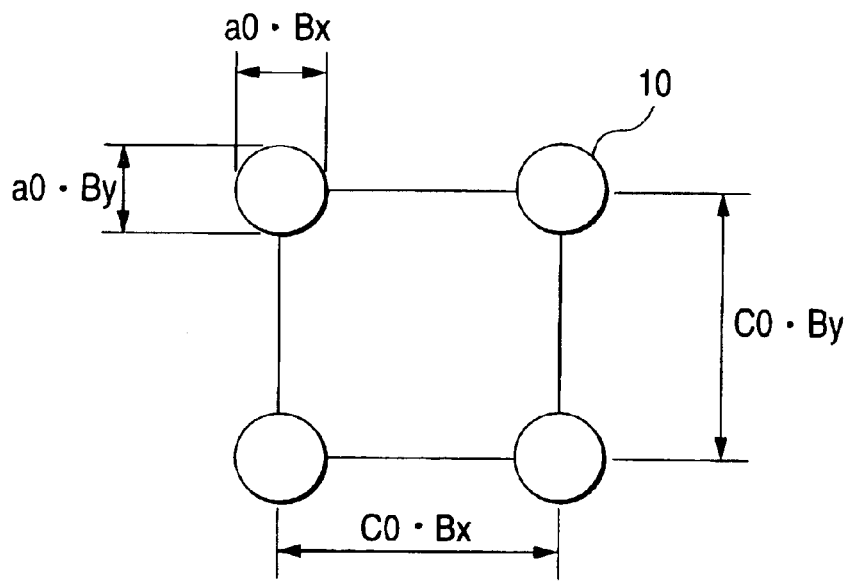
FIG. 3 is a drawing to show spots on a scanned medium.

Referring now to the accompanying drawings, there are shown preferred embodiments of the invention. FIG. 1 is a whole perspective view of a light scanner according to a first embodiment of the invention.

Laser light is emitted from a light source 1 of a two-dimensional square array of a plurality of laser light source elements and is converted into collimated light through a coupling lens system 2 implemented as a collimator lens, the light flux width in the subscanning direction is limited through a slit 3, and the light flux width in the main scanning direction is enlarged or shrunk through a shaping lens system consisting of a cylindrical lens 4 and a lens 5. Through the lens 5, an image of the light flux having spread in the subscanning direction is formed linearly on light beam deflection means 6. Then, an image of the light flux deflected and scanned by the light beam deflection means 6 is formed on a scanned medium 8 implemented as a photoconductor drum in a scanning lens system 7.

Figure 4:
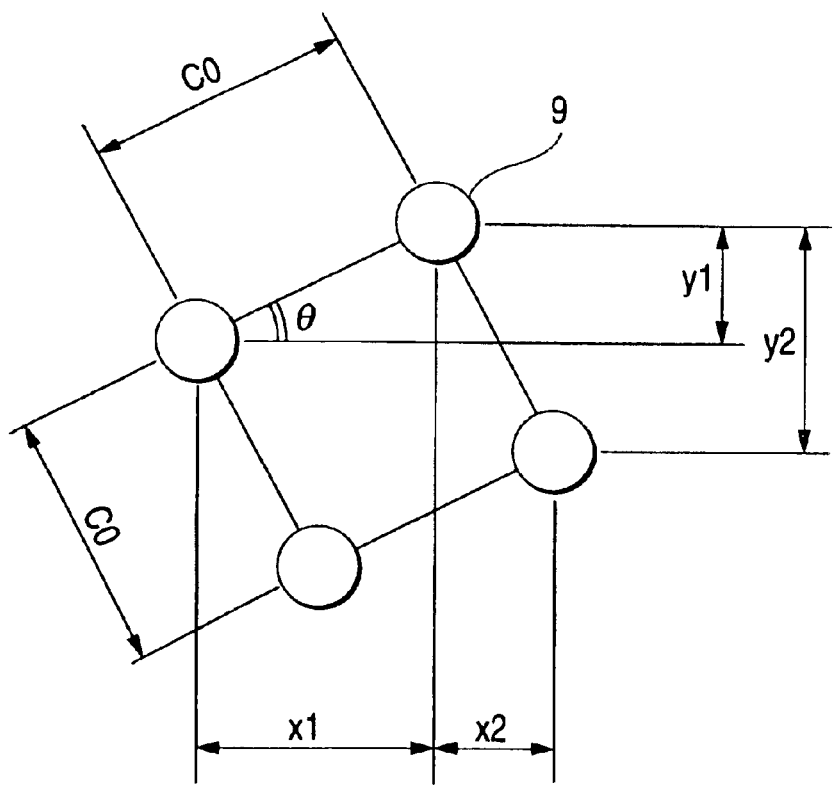
FIG. 4 is a drawing to show a state in which the light source of a two-dimensional square array is rotated.
Figure 5:
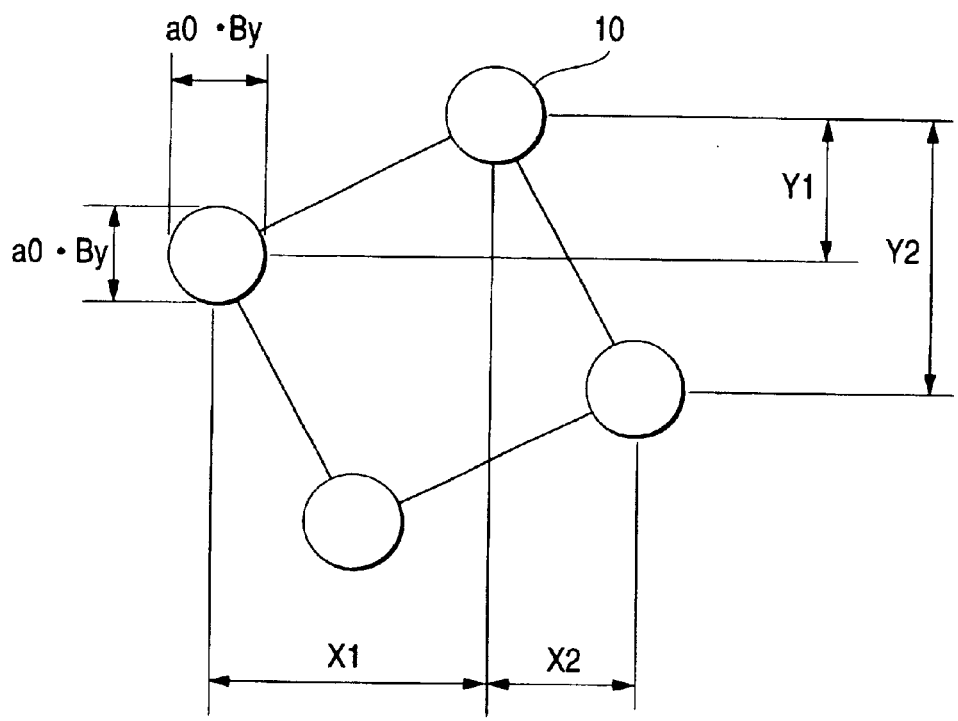
FIG. 5 is a drawing to show rotated spots on the scanned medium.

When the number of light source elements arranged in the main scanning direction is n, the light source elements may be rotated by θ as in FIG. 4 to make the scanning line spacing in the subscanning direction equal as described above, and thus expression (1) may be made to hold. The scanning spacing at this time needs to be made scanning line spacing d corresponding to the print dot density used and thus expression (9) is changed to provide expression (12).

$$d = By \, c0 \sin \theta \qquad (12)$$

That is, to set the element spacing to ca0 and the scanning line spacing to d when the number of light source elements arranged in the main scanning direction is n, a scanning lens system may be implemented with θ satisfying expression (1) and the subscanning direction magnification By satisfying expression (12).

Figure 6:
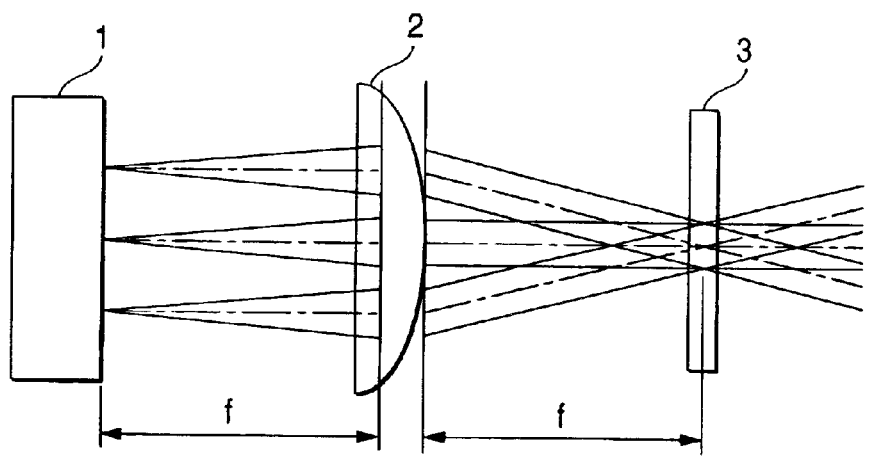
FIG. 6 is a drawing to show a situation in the proximity of a combining optical system.

In the invention, assuming that the focal length of the coupling lens system (collimator lens) 2 is f, the slit 3 for limiting the subscanning direction width of the light flux is placed at a location at a distance of about f from the coupling lens system 2 in an opposite direction to the light source 1. The location is a location where all of collimated light beams into which a plurality of light beams generated from the light source 1 are converted through the coupling lens system 2 cross each other as shown in FIG. 6. It is an important point of the invention that the slit 3 for limiting the light flux width in the subscanning direction is placed at the location, whereby a plurality of light fluxes can be adjusted at the same time through one slit 3.

Letting the subscanning direction light flux width before slit be S0, the subscanning direction light flux width after slit be S1, and the subscanning direction magnification of the scanning lens system 7 be By, subscanning direction spot diameter Dy is found from expression (13).

$$Dy = S0 \cdot a0 \cdot By/S1 \qquad (13)$$

Thus, if By is determined by expression (12) and a0 and S0 are determined by the specifications of the light source 1 and the coupling lens system 2 respectively according to the invention, S1 can be changed for changing Dy and any desired scanning lens system 7 can be implemented.

Letting the subscanning direction width of the slit be S1, the size of each light source element be a0, the subscanning direction magnification of the scanning lens system be By, the subscanning direction width of the light flux just before slit be S0, and the scanning line spacing at the scanning time be d, if the following expression (3) is satisfied, the subscanning direction spot diameter becomes larger than the scanning spacing, so that scanning with no scanning gap can be conducted.

$$S1 \leq a0 \cdot By \cdot S0/d \qquad (3)$$

Specific numeric values are actually assigned in the description that follows. The size a0 of each light source element is 2.1 μm, the spacing c0 is 90 μm, the number of the light source elements making up an array, n, is 36 in total (6 in the main scanning direction and 6 in the subscanning direction), and the light source wavelength is 780 nm. The case where the target of the scanning line spacing d at the use time is 21.17 μm corresponding to 1200 dpi, the target of main scanning direction spot diameter Dx is 31.76 μm (1.5 times the scanning line spacing), and the target of the subscanning direction spot diameter Dy is also 31.76 μm (1.5 times the scanning line spacing) will be discussed.

In this case, if main scanning direction magnification Bx=15.12 times, the main scanning direction spot diameter Dx becomes 31.76 μm. To draw scanning line evenly, the rotation angle of the light source 1 is found as θ=9.462 degrees from expression (1). At this time, By is found to be 1.431 times from expression (2). From expression (13), to set Dy to 31.76 µm, slit S1 with S0/S1=10.57 may be entered.

Figure 7:
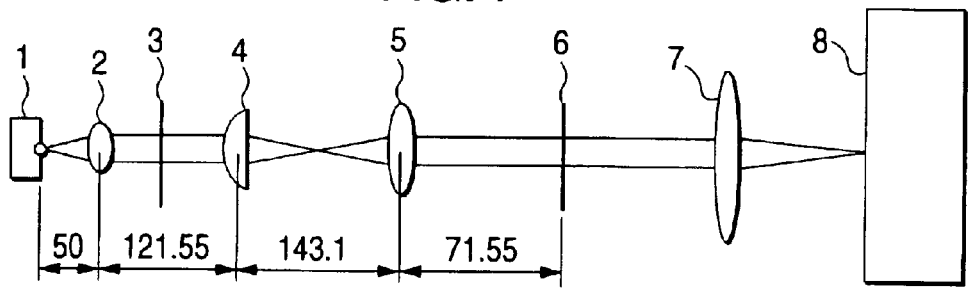
FIG. 7 is a drawing to view a scan surface from above in an optical system of the light scanner according to the first embodiment of the invention.
Figure 8:
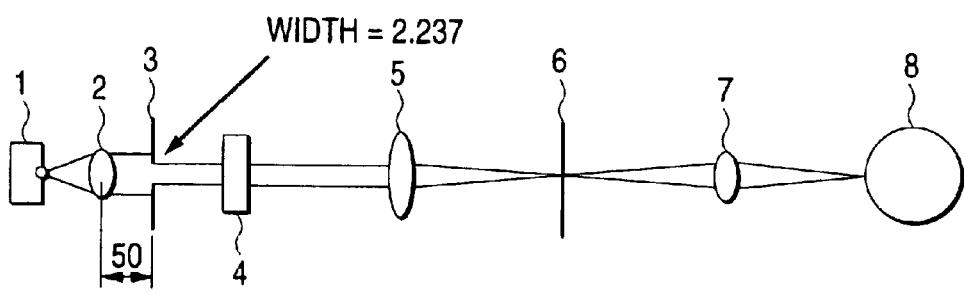
FIG. 8 is a drawing to view the scan surface from side in the optical system of the light scanner according to the first embodiment of the invention.

FIG. 7 is a drawing to view a scan surface from above in the optical system of the light scanner according to the first embodiment of the invention, and FIG. 8 is a drawing to view the scan surface from side in the optical system of the light scanner according to the first embodiment of the invention. The units of the numeric values indicating the spacings in FIGS. 7 to 10 are all mm.

The focal length of the coupling lens system (collimator lens) 2 is 50 mm, that of the cylindrical lens 4 is 82.4 mm, that of the lens 5 is 70.55 mm, and that of the scanning lens system 7 is 756.3 mm. The members are placed as in FIGS. 7 and 8.

At this time, the main scanning direction magnification is 15.12 times and the subscanning direction magnification is 1.431 times. The main scanning direction spot diameter Dx becomes 31.76 µm as the target and if 2.237-mm slit 3 is entered, the subscanning direction spot diameter Dy becomes 31.76 µm as the target. At this time, if the scanning spacings are made uniform, the scanning spacing becomes 21.17 µm corresponding to 1200 dpi and satisfies the target. In the embodiment, the shape of the hole of the slit 3 is rectangular.

Figure 9:
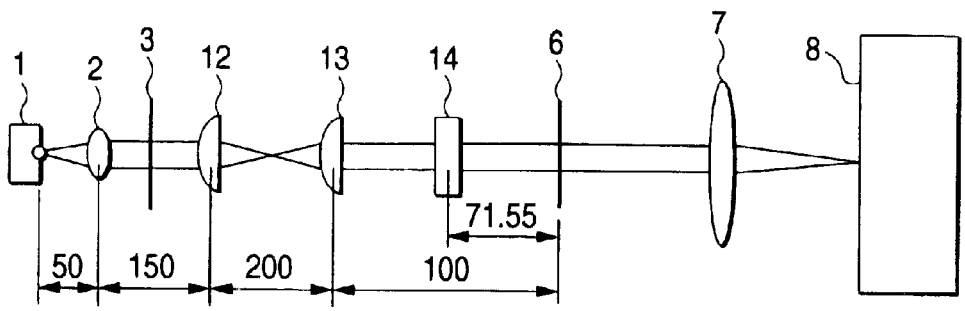
FIG. 9 is a drawing to view a scan surface from above in an optical system of a light scanner according to a second embodiment of the invention.
Figure 10:
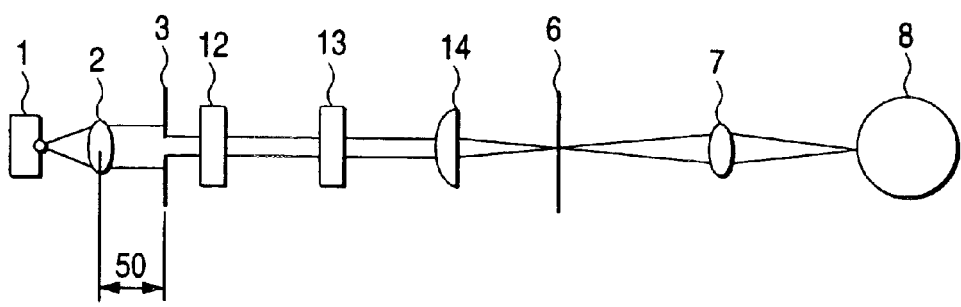
FIG. 10 is a drawing to view the scan surface from side in the optical system of the light scanner according to the second embodiment of the invention.

FIG. 9 is a drawing to view a scan surface from above in an optical system of a light scanner according to a second embodiment of the invention, and FIG. 10 is a drawing to view the scan surface from side in the optical system of the light scanner according to the second embodiment of the invention. The focal length of a coupling lens system (collimator lens) 2 is 50 mm, that of a cylindrical lens 12 is 100 mm, that of a cylindrical lens 13 is also 100 mm, that of a cylindrical lens 14 is 71.55 mm, and that of a scanning lens system 7 is 756.3 mm. The members are placed as in FIGS. 9 and 10.

At this time, the main scanning direction magnification is 15.12 times and the subscanning direction magnification is 1.431 times. The main scanning direction spot diameter Dx becomes 31.76 µm and if 2.237-mm slit 3 is entered, the subscanning direction spot diameter Dy becomes 31.76 µm. At this time, if the scanning spacings are made uniform, the scanning spacing becomes 21.17 µm corresponding to 1200 dpi and satisfies the target.

In the above-described embodiment, the light flux width in the main scanning direction in the optical system is held proper and to control the spot diameter in the subscanning direction, the slit 3 for limiting the light flux width in the subscanning direction is placed at the location at a distance of about f from the coupling lens system 2 with the focal length f in the opposite direction to the light source 1. The light flux width in the subscanning direction in the optical system is held proper and to control the spot diameter in the main scanning direction, if main scanning direction slit is placed at the same location, the light flux widths of all light fluxes can be changed at the same time and thus it is convenient.

In the above-described embodiment, the light source of the two-dimensional square array wherein the number of the elements in the main scanning direction is the same as that of the elements in the subscanning direction is described, but if the number of the elements in the main scanning direction differs from that of the elements in the subscanning direction, it is effective to enter the slit 3 in a similar manner.

The light scanner shown in the above-described embodiment is built in an image formation apparatus such as a laser beam printer for performing high-speed print or high-dot-density print, for example.

As described above, according to the invention, there can be provided the light scanner for enabling the scanning line spacing and the spot diameter to be set to predetermined values if the light source of a two-dimensional array is used, and an image formation apparatus using the light scanner.

What is claimed is:

1. A light scanner comprising:
    a light source of a two-dimensional array including a plurality of light source elements;
    a coupling lens system for collimating a light flux from said light source;
    a shaping lens system for shaping the light flux;
    a light beam deflector for deflecting and scanning the post-shaped light flux; and
    a scanning lens system for forming an image of the deflected and scanned light flux on a scanned medium,
    wherein assuming that a focal length of said coupling lens system is f, between said coupling lens system and said light beam deflection means, a slit comprising a rectangular cut for shielding a part of the light flux to limit the light flux width is placed at a location at a distance of about f from said coupling lens system in an opposite direction to said light source,
    wherein the slit for shielding a part of the light flux maintains the light flux width in a main scanning direction.

2. An image formation apparatus using a light scanner as claimed in claim 1.

3. The light scanner as claimed in claim 1, wherein the slit comprises a rectangular slit.

4. The light scanner as claimed in claim 1, wherein said slit is disposed between said coupling lens system and said shaping lens system.

5. The light scanner as claimed in claim 1, wherein the slit is placed at a location where a plurality of light fluxes can be adjusted at a same time through the slit.

6. The light scanner as claimed in claim 1, wherein the slit for shielding a part of the light flux limits the light flux width in a subscanning direction.

7. A light scanner comprising:
    a light source of a two-dimensional array including of a plurality of light source elements;
    a coupling lens system for collimating a light flux from said light source;
    a shaping lens system for shaping the light flux;
    a light beam deflector for deflecting and scanning the post-shaped light flux; and
    a scanning lens system for forming an image of the deflected and scanned light flux on a scanned medium,
    wherein assuming that a focal length of said coupling lens system is f, between said coupling lens system and said light beam deflection means, a slit for shielding a part of the light flux to limit the light flux width is placed at a location at a distance of about f from said coupling lens system in an opposite direction to said light source, and
    wherein n light source elements making up the two-dimensional array are roughly equally spaced from each other in a direction forming angle θ with a main scanning direction and the relation of expression (1) is satisfied $$\tan \theta = 1/n \tag{1}$$

8. An image formation apparatus using a light scanner as claimed in claim 7.

9. A light scanner comprising:
    a light source of a two-dimensional array including a plurality of light source elements;

a coupling lens system for collimating a light flux from said light source;

a shaping lens system for shaping the light flux;

a light beam deflector for deflecting and scanning the post-shaped light flux; and a scanning lens system for forming an image of the deflected and scanned light flux on a scanned medium, wherein assuming that a focal length of said coupling lens system is f, between said coupling lens system and said light beam deflection means, a slit for shielding a part of the light flux to limit the light flux width is placed at a location at a distance of about f from said coupling lens system in an opposite direction to said light source, and wherein the source elements making up the two-dimensional array are arranged with spacing of c0 in a direction forming angle θ with a main scanning direction and when subscanning direction magnification of said scanning lens system is By and scanning line spacing at the scanning time is d, expression (2) is satisfied $$By = d/(c0 \cdot \sin θ) \qquad (2).$$

10. An image formation apparatus using a light scanner as claimed in claim 9.

11. A light scanner comprising:

a light source of a two-dimensional array including a plurality of light source elements;

a coupling lens system for collimating a light flux from said light source;

a shaping lens system for shaping the light flux;

a light beam deflector for deflecting and scanning the post-shaped light flux; and a scanning lens system for forming an image of the deflected and scanned light flux on a scanned medium, wherein assuming that a focal length of said coupling lens system is f, between said coupling lens system and said light beam deflection means, a slit for shielding a part of the light flux to limit the light flux width is placed at a location at a distance of about f from said coupling lens system in an opposite direction to said light source, and wherein when the subscanning direction width of the slit is S1, the size of each light source element is a0, subscanning direction magnification of said scanning lens system is By, the subscanning direction width of the light flux just before slit is S0, and scanning line spacing at the scanning time is d, expression (3) is satisfied $$S1 \leq a0 \cdot By \cdot S0/d \qquad (3).$$

12. An image formation apparatus using a light scanner as claimed in claim 11.

13. A light scanner comprising:

a light source;

a coupling lens for collimating a light flux from said light source;

a shaping lens for shaping the light flux;

a light beam deflector for deflecting and scanning the post-shaped light flux;

a scanning lens for forming an image of the deflected and scanned light flux on a scanned medium, and a slit for limiting a width of the light flux in a first direction, wherein the slit is disposed between said coupling lens and said light beam deflector at a distance, from said coupling lens in an opposite direction to said light source, substantially equal to a focal length of said coupling lens, and wherein a width of the light flux in a second direction is not limited by the slit.

14. The light scanner as claimed in claim 13, wherein the width of the light flux in the first direction is not equal to the width of the light flux in the second direction.

15. The light scanner as claimed in claim 13, wherein said slit is disposed between said coupling lens and said shaping lens.

16. A light scanner method, comprising:

collimating a light flux from a light source;

shielding a part of the light flux;

shaping the light flux;

deflecting and scanning the post-shaped light flux;

forming an image of the deflected and scanned light flux on a scanned medium, wherein a location of said shielding is a distance that is substantially equal to a focal length from a location of said collimating in an opposite direction to said light source, said location of said shielding being between said location of said collimating and a location of said deflecting and scanning, and spacing n light source elements of said light source substantially equally from each other in a direction forming angle θ with a main scanning direction, wherein a relation of expression (1) is satisfied $$\tan θ = 1/n \qquad (1).$$

17. A light scanner method, comprising:

collimating a light flux from a light source;

shielding a part of the light flux;

shaping the light flux;

deflecting and scanning the post-shaped light flux;

forming an image of the deflected and scanned light flux on a scanned medium, wherein a location of said shielding is a distance that is substantially equal to a focal length from a location of said collimating in an opposite direction to said light source, said location of said shielding being between said location of said collimating and a location of said deflecting and scanning, and arranging light source elements of said light source with a spacing of c0 in a direction forming angle θ with a main scanning direction, wherein when subscanning direction magnification of said scanning lens system is By and scanning line spacing at the scanning time is d, expression (2) is satisfied $$By = d/(c0 \cdot \sin θ) \qquad (2).$$

18. A light scanner method, comprising:

collimating a light flux from a light source;

shielding a part of the light flux;

shaping the light flux;

deflecting and scanning the post-shaped light flux;

forming an image of the deflected and scanned light flux on a scanned medium, wherein a location of said shielding is a distance that is substantially equal to a focal length from a location of said collimating in an opposite direction to said light source, said location of said shielding being between said location of said collimating and a location of said deflecting and scanning, and wherein a subscanning direction width of the light flux at said location of shielding is S1, the size of each light source element is a0, subscanning direction magnification of said light flux by said deflecting and scanning is By, the subscanning direction width of the light flux just before said location of shielding is S0, and scanning line spacing at the scanning time is d, expression (3) is satisfied $$S1 \leq a0 \cdot By \cdot S0/d \tag{3}.$$

* * * * *